Nov. 5, 1968 M. J. CANTELLA 3,409,789
ELECTRICAL SPATIAL DISCRIMINATION TECHNIQUE FOR
IMAGE SCANNING SENSORS
Filed Sept. 30, 1965 7 Sheets-Sheet 1

INVENTOR
MICHAEL J. CANTELLA

BY Claude Funkhouser ATTORNEY
Robert F. Beers AGENT

Nov. 5, 1968 M. J. CANTELLA 3,409,789

ELECTRICAL SPATIAL DISCRIMINATION TECHNIQUE FOR IMAGE SCANNING SENSORS

Filed Sept. 30, 1965 7 Sheets-Sheet 2

Nov. 5, 1968 M. J. CANTELLA 3,409,789

ELECTRICAL SPATIAL DISCRIMINATION TECHNIQUE FOR IMAGE SCANNING SENSORS

Filed Sept. 30, 1965 7 Sheets-Sheet 3

United States Patent Office 3,409,789

Patented Nov. 5, 1968

3,409,789

ELECTRICAL SPATIAL DISCRIMINATION TECHNIQUE FOR IMAGE SCANNING SENSORS

Michael J. Cantella, Burlington, Mass., assignor, by mesne assignments, to the United States of America as represented by the Secretary of the Navy Filed Sept. 30, 1965, Ser. No. 492,365

4 Claims. (Cl. 328—112)

ABSTRACT OF THE DISCLOSURE

There is disclosed a system which is basically a time domain filter capable of selecting positive pulses which exceed a selectable minimum amplitude and which are narrower than a selectable width, even though these pulses are superimposed on reasonably high level background signals.

This invention relates to discrimination techniques and more particularly to an electronic discrimination apparatus to process the electrical output from an infrared raster scanning sensor for detecting the presence of and determining the location of a point target source in an extended cloud background environment.

Most present day tracking systems perform the desired target/background discrimination by the use of mechanical chopping reticles which are positioned in front of a single cell detector. The reticle shape is chosen so that minimum modulation is produced by the extending background and maximum modulation is produced by the point target source. These tracking systems have certain inherent limitations, since it is necessary for them to analyze the entire field of view simultaneously because all of the energy in the field of view is collected by a single cell detector. This causes a serious disadvantage in the use of a single cell system since the cell used must possess sufficient dynamic range to handle the energy from the entire field of view. Another disadvantage of the single cell technique is that simultaneous filtering of all the background within the field of view can produce a residual modulation whose amplitude is high compared to that produced by the point target. Because of the above discussed disadvantages, the present day single cell trackers are normally limited to a maximum field of view of a few degrees. This relatively small field of view limits the tracker's ability to acquire the target both initially and after a momentary target loss.

There is a need in many military and commercial applications for recognition techniques that are able to distinguish and display desired radar targets without their being masked by background clutter. In radar systems, one of the most troublesome forms of clutter is that which results from cloud formations. The types of cloud radiance patterns which cause the most difficulty are those that produce a constant radiation pattern and give high level background radiation. This type of radiant background reduces the detectibility of point targets by the radar system but will generally not produce a false target signal. Other types of cloud formations will produce cloud radiance which produce false target signals and these false target signals are detrimental to and cause serious limitations in tracking system performance.

Image sensors of the raster-scanning type could provide superior discrimination capability because each portion of the image under observation can be examined separately and unambiguously. Since best discrimination occurs from the examination of only a small area at a time rather than the entire field of view simultaneously, the ultimate performance of such a system, of course, is limited only by the size of an individual resolution element rather than the size of the field of view. Further, the dynamic range of an image sensor is better than that of the single cell type system because the radiance from the scene is distributed over the total number of resolution elements rather than being concentrated on a single cell. Also the use of an image sensor will permit the possibility of handling multiple and extended targets whenever a radar system is in a track-while-scan mode of operation. Therefore, a raster scanning image sensor would be capable of being used to overcome the prior art disadvantages by providing a discriminator circuitry apparatus that can properly process the large quantity of information obtainable from such sensors. The present invention seeks to provide improved radar tracking detection by use of an infrared raster scanning image sensor and discriminator circuitry apparatus that can permit electronic discrimination which is superior to that achieved with single cell sensors. The circuitry uses time domain processing of the video signals obtained from a scanning system for recognition and detection of point response waveforms and rejection of extended background waveforms. This discrimination circuitry takes advantage of the fact that, in general, desired targets such as aircraft are very small with respect to cloud background returns. Thus, the major difference between the wanted and unwanted waveform will be that of pulse width. This causes the desired point response waveform to be relatively narrow, whereas the waveforms from cloud background will be relatively wide. Under a condition of point source for a target imposed on a cloud background, there is a substantial difference between the usual pulse width discrimination requirement. In the instant case, the discrimination technique permits detection of the narrow width pulse video, representing the target, and this pulse video is detectable while it is superimposed in high gradient level caused by background cloud signal return. Thus, the discriminator minimizes the video background level with a minimum of complexity and permits the use of an image sensor that improves a tracking system's dynamic range and also allows the handling of multiple and extended targets in a radar system which is in a track-while-scan mode of operation.

An object of the present invention is the provision of a discriminator that is workable with a raster scanning-image sensor.

Another object of the present invention is the provision of a discriminator apparatus that allows a point source video return to be distinguished from cloud background video returns.

Still another object of the present invention is to provide a discrimination apparatus that permits a tracking system to have an improved dynamic range capability and which allows the handling of a multiplicity of targets in a tracking mode of operation.

Another object of the present invention is the provision of a delay line discriminator circuitry apparatus that can be utilized for both single and two dimensional discrimination.

A further object of the present invention is the provision of an electronic spatial discriminator that is capable of use with a high resolution image scanning sensor.

Still further object of the present invention is the provision of a discriminator apparatus that provides for automatic detection of a point source return and rejection of an extended cloud background return.

Another object of the present invention is the provision of a discriminator circuitry apparatus that permits separation of a point source from background clutter.

Other objects, advantages and novel features of the invention will become apparent from the following detailed description of the invention when considered in conjunction with the accompanying drawings wherein.

Figure 1:
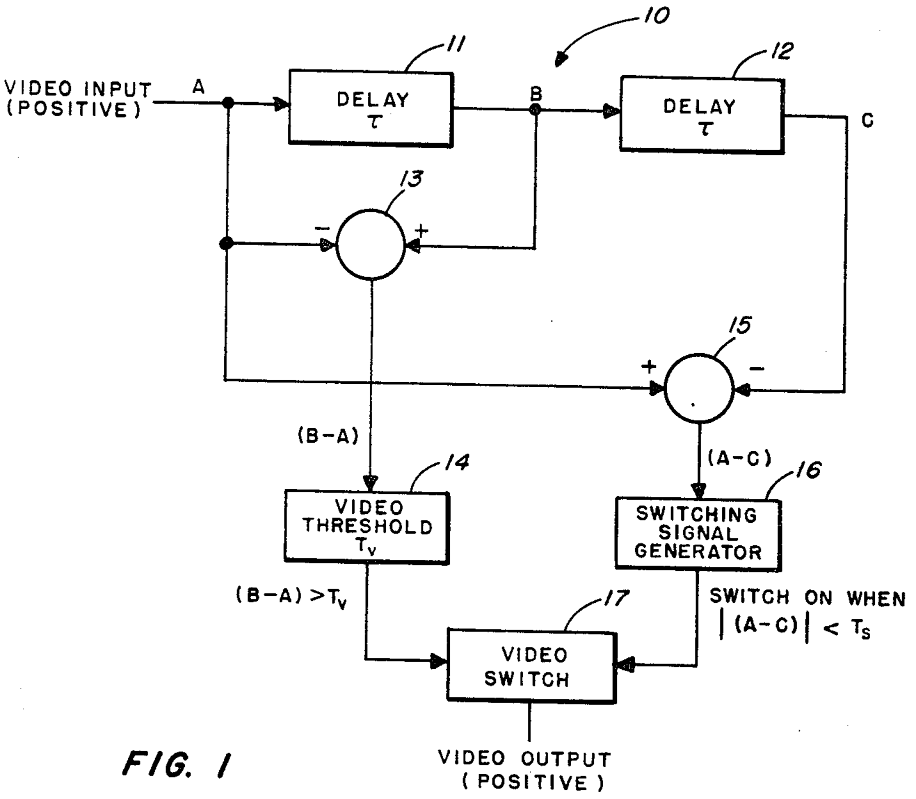
FIG. 1 illustrates a function block diagram of the discriminator circuitry apparatus.
Figure 3:
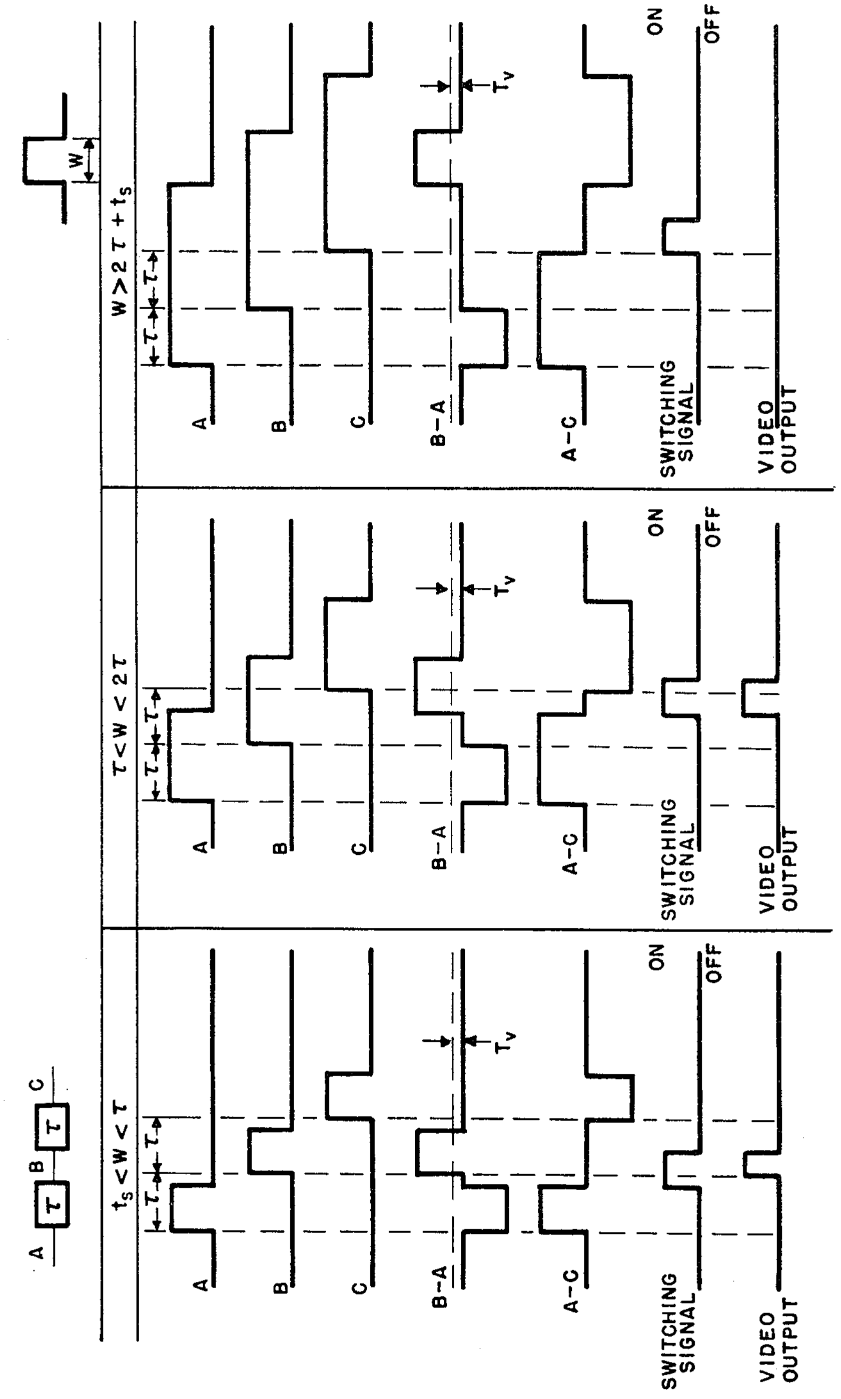
FIG. 3 illustrates the discriminator circuitry pulse width selection waveforms.

With reference to FIG. 1 which shows a functional block diagram of the discriminator system having a positive video input from a raster scanning sensor (not shown), a video input waveform corresponding to waveform A, best shown by reference to FIG. 3, is fed into a first delay circuitry block 11. The output waveform of delay block 11 is coupled to feed the delayed A waveform, which will be hereinafter referred to as B waveform, into a second circuitry delay block 12. A summing functional block 13 is connected in parallel circuitry arrangement across functional block 11. This summing block has two inputs and receives both the A waveform and the B waveform. Another summing block 15 is connected in parallel circuitry arrangement with the series connected delay functional blocks 11 and 12, respectively. Summing block 15 also has two input circuits for receiving the undelayed waveform A and the twice delayed waveform C. An output waveform, designated as $B-A$, is coupled from summing amplifier 13 to the input of video threshold functional block 14. The output of the video threshold block couples the signal $B-A>T_v$ to a first input on video switch 17. Summing amplifier 15, which has a waveform output proportional to the quantity $A-C$, is coupled to switching generator functional block 16. The output waveform of this functional block is representative of the quantity $A-C<T_s$ and a signal representative of this electrical quantity is coupled to the second input of video switch 17. An output taken from video switch 17 represents a positive waveform which contains the analogue amplitude of the portion of the difference signal which exceeds the threshold value $T_v$.

The function of the discriminator circuitry is to time domain process the video signal from a raster scanning system to allow recognition and detection of point response waveforms and rejection of extended background waveforms. This is accomplished by using a variable delay sub-system and examining the video waveform at several points simultaneously in this sub-system. Appropriate logic is then connected to the delay sub-system to permit detection of only the desired waveshape and provide for rejection of unwanted waveforms. As pointed out above, one of the major differences between the wanted and unwanted waveforms is that of video pulse width. The desired point response waveform is narrow, whereas the waveform from cloud backgrounds is relatively wide. The detection technique described is one which will distinguish a narrow width pulse waveform that is superimposed on relatively high level and high radiant background.

Figure 2:
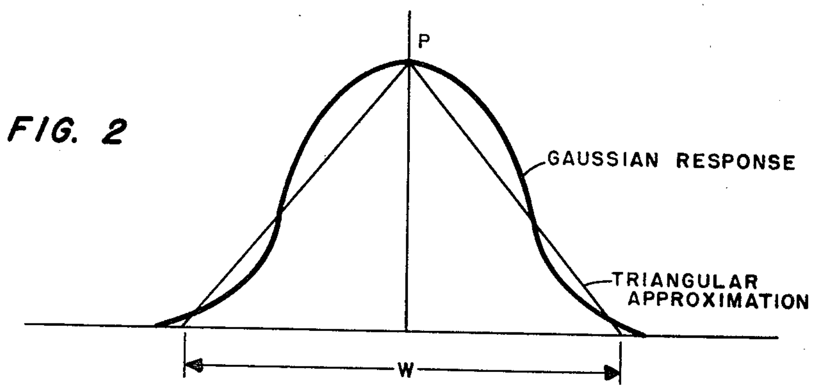
FIG. 2 illustrates the system point response curve and its triangular approximation.

Generally, the delay line discriminator shown in FIG. 1 requires matching the discriminator parameters to the point response of the image scanning video system. The point aperture response of the system is approximately gaussian, as illustrated in FIG. 2. In order to simplify the development of useful mathematical criteria for discriminator performance, the point response is approximated by a triangular waveform and this triangular waveform, as shown in FIG. 2, has an amplitude P and a pulse width D. Triangular approximations are appropriate in this case because the delay line discriminator samples simultaneously three points on the video waveform and makes a decision based on the amplitude at these points. Therefore, mathematical detection criteria has been developed on the basis of triangular approximation of typical waveforms of interest. The waveforms include (1) an isolated video pulse representing a point target or cloud, (2) a pulse superimposed on a high level background, and (3) a pulse superimposed on a constant gradient background. Throughout the analysis, it is assumed that the switching signal generator is a simple device which turns the video on at the time when waveform A equals waveform C. The discrimination criteria are expressed in terms of pulse width, pulse amplitude P, delay time $\tau$, and video threshold $T_v$.

Details of the development of mathematical criteria for discriminator performance may be seen with reference to copending application Ser. No. 492,364, Filed Sept. 30, 1965, now Patent No. 3,315,168. A summary of the criteria developed are presented in the table below.

In order to illustrate the basic operation of the circuit, consider the propagation, along the tapped delay line, of a positive pulse of amplitude P and width W. Table 1 summarizes all possible signal-states which occur at different times for conditions of $0<W<\tau$ (case I), $\tau<W<2\tau$ (case II), and $2\tau<W<\infty$ (case III).

TABLE I.—DISCRIMINATION CIRCUIT SIGNAL STATES

| | |
|---|---|
| **Case I $0<W<\tau$ (pulse to be detected)** | |
| Condition 1: A=P, B=0, C=0 | Condition 2: A=0, B=P, C=0 |
| Condition 3: A=0, B=0, C=P | Condition 4: A=0, B=0, C=0 |
| **Case II $\tau<W<2\tau$ (pulse to be detected)** | |
| Condition 1: A=P, B=0, C=0 | Condition 2: A=P, B=P, C=0 |
| Condition 3: A=0, B=P, C=0 | Condition 4: A=0, B=P, C=P |
| Condition 5: A=0, B=0, C=P | Condition 6: A=0, B=0, C=0 |
| **Case III $2\tau<W<\infty$ (pulse to be rejected)** | |
| Condition 1: A=P, B=0, C=0 | Condition 2: A=P, B=P, C=0 |
| Condition 3: A=P, B=P, C=P | Condition 4: A=0, B=P, C=P |
| Condition 5: A=0, B=0, C=P | Condition 6: A=0, B=0, C=0 |

Referring now to FIGS. 4*a* through 4*e* which shows a complete detailed schematic diagram of the electronic discrimination circuitry, a video input waveform from a raster-scanner sensor, not shown, is capacitively coupled from terminal 1 to the base of a video amplifier (transistor 22). Transistor 22, as shown, is connected in a grounded emitter configuration and has its output capacitively coupled to transistor 24 by means of capacitor 23; capacitor 23 being coupled from the collector of transistor 22 to the base of a transistor 24. The video output from transistor 24 is taken from its collector and this output is adjustable by means of video gain control potentiometer 25. One side of the adjustable arm of the potentiometer 25 couples the video signal to the base of transistor 26. An output from the emitter of transistor 26 is capacitively coupled to the base of transistor 28. Transistor 29 is directly coupled, by means of its base, to the collector of transistor 28. Transistor 29 is a PNP transistor which has its emitter series coupled to ground via resistor 31, variable delay network 32 and resistor 20. An output is capacitively coupled by means of capacitor 77 from junction 32 to the base of transistor 78 which forms part of the video summing amplifier circuitry.

The delayed output is taken from video variable delay network 33 and is capacitively coupled to the base of transistor 35 via coupling capcitor 34. The output of transistor 35 is directly coupled to transistor 36 by coupling its base to the collector of transistor 35. A resistive delay network couples the emitter of transistor 36 to ground potential. This network is made up of a series resistor 37, variable delay network 38, and series resistor 30. The output from the variable delay network 38 is directly coupled to the base of transistor 41. This transistor has a circuitry arrangement in its base circuit which consists of a variable potentiometer 39 and a series resistor (not numbered). This circuitry allows adjustment of AC balance for the differential amplifier circuitry. The base of transistor 27 is also coupled directly to variable delay network 34. An output is capacitively coupled from the emitter of this transistor to the base of transistor 104 by means of coupling capacitor 103.

Figure 4A:
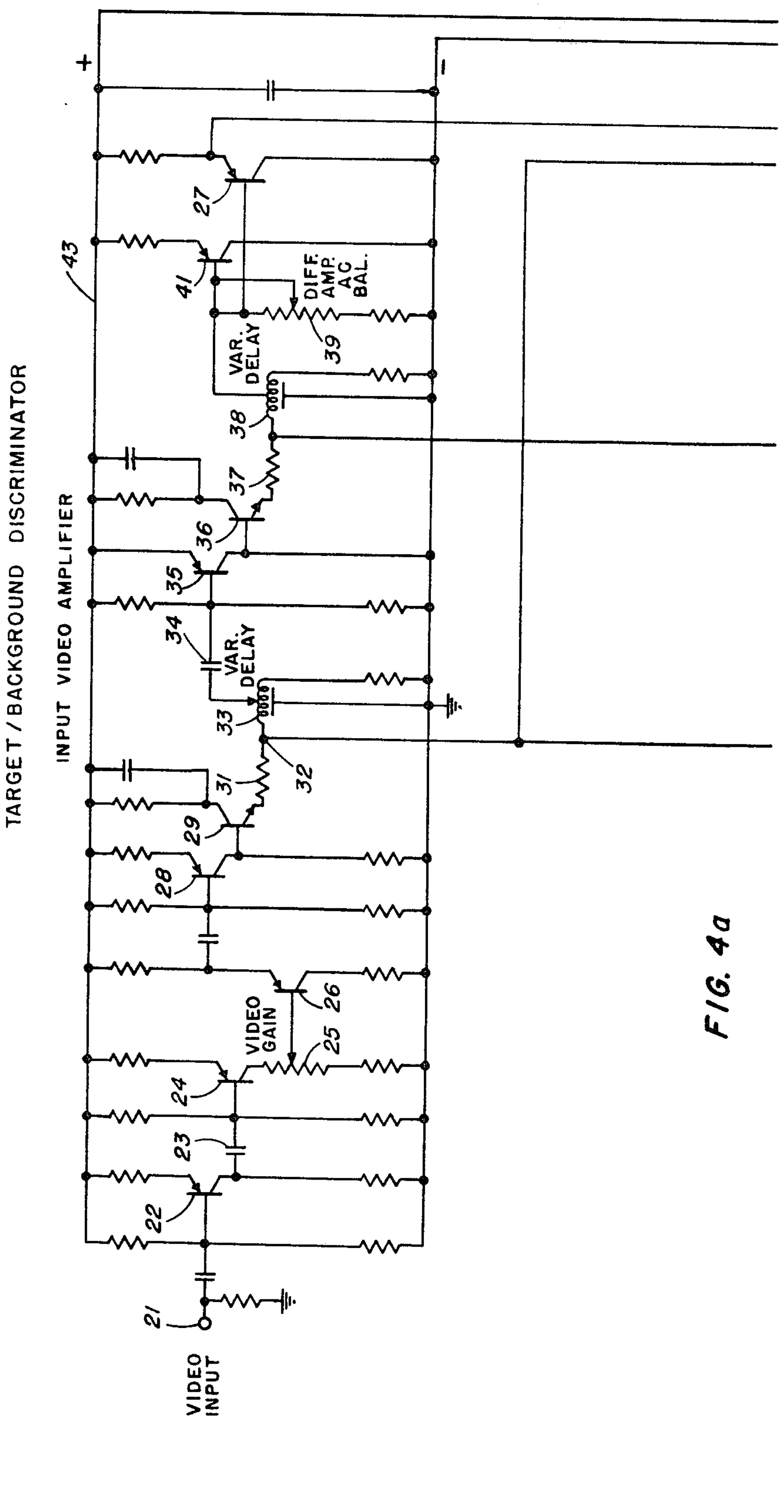
FIG. 4 (*a–e*) illustrates a complete schematic diagram of the discriminator circuitry apparatus.
Figure 4B:
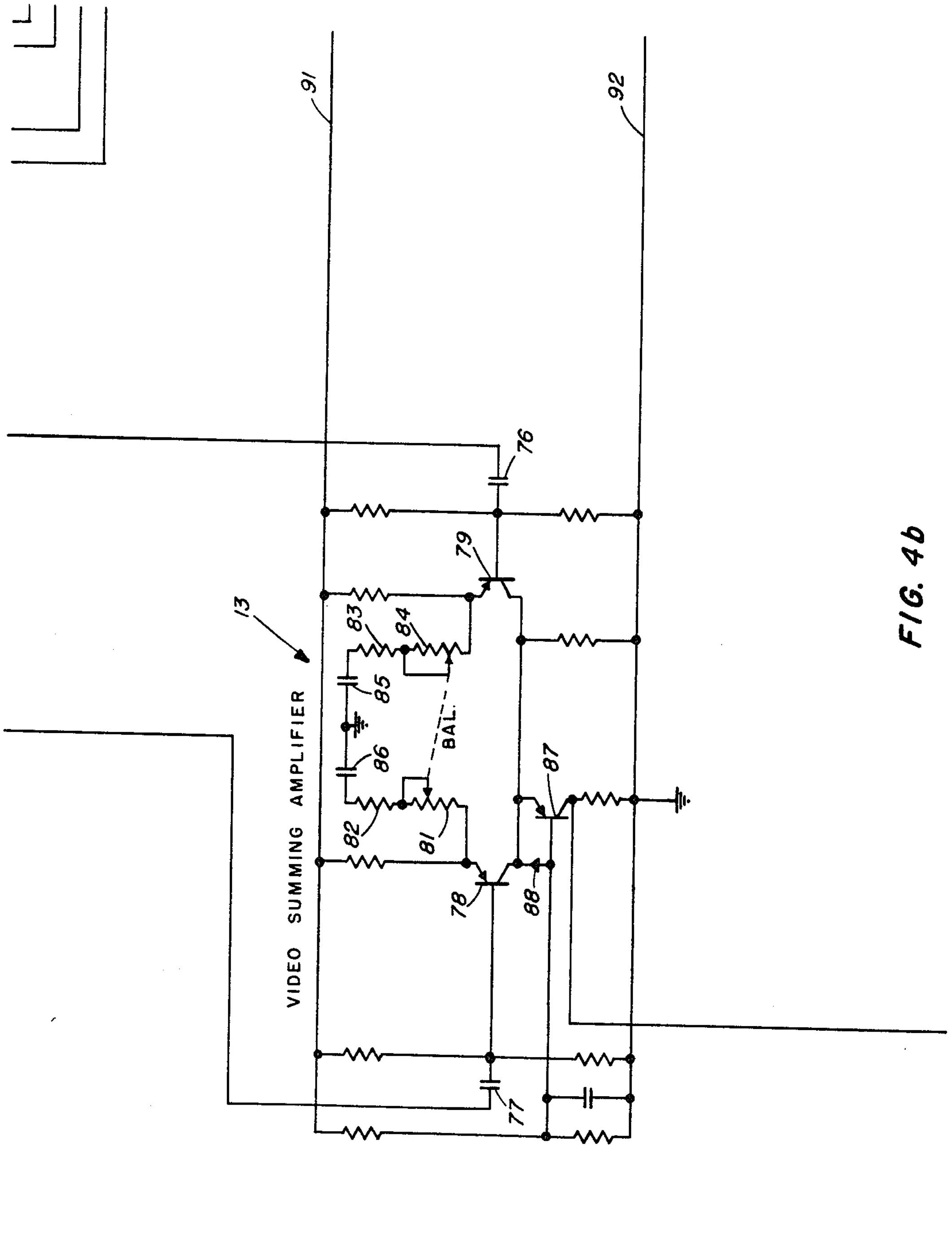
Figure 4C:
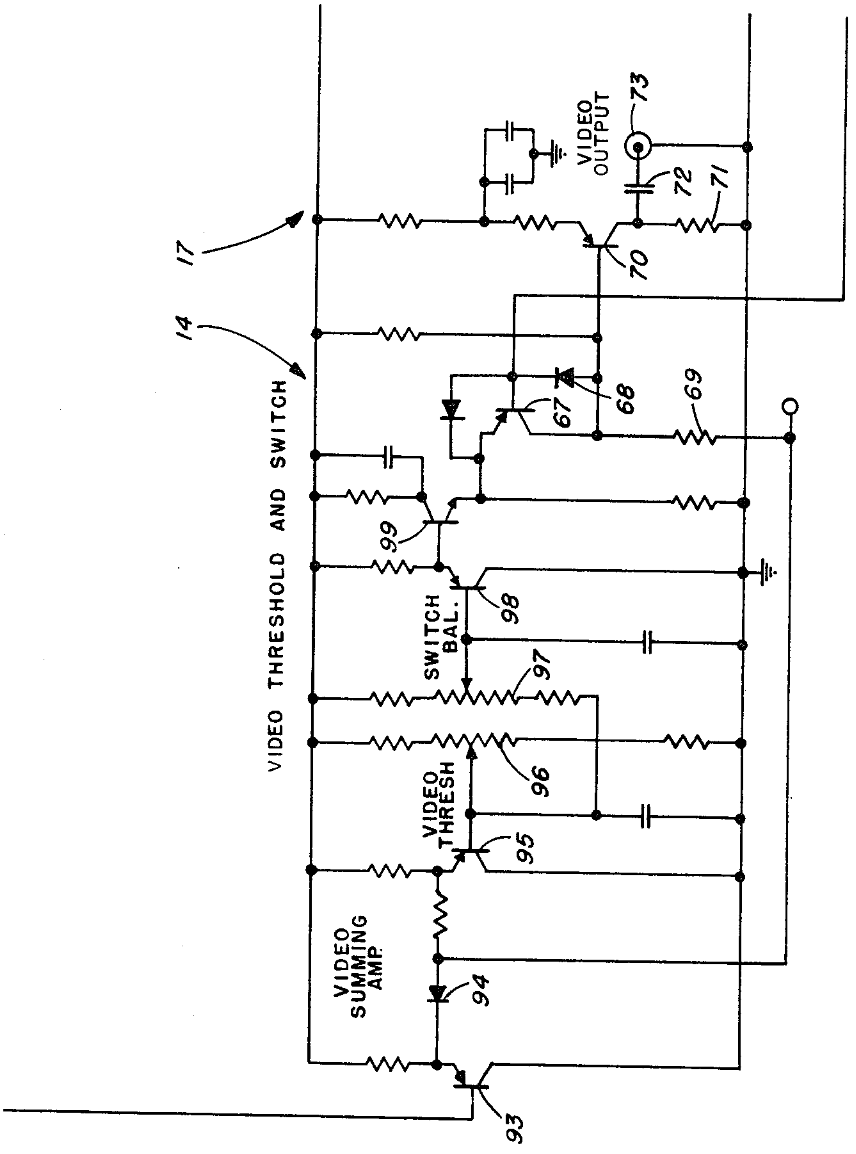

Now referring to FIG. 4*b* which shows a detailed illustration of the video summing amplifier circuitry, it can be seen that the two waveforms A and B, respectively, are coupled to the base of transistors 78 and 79, respectively. The emitter circuitry of both of these transistors is connected to a common ground potential via similar balancing networks. These balancing networks comprise adjustable resistors 81 and 84 series connected to resistors 82 and 83 which in turn are coupled to ground potential via capacitors 85 and 86. The collector of transistor 78 and transistor 79 is coupled together and is coupled to the emitter of transistor 87. Transistor 87 has a diode 88 coupled from its base to its emitter. The video output representative of the *B—A* waveform, best shown in FIG. 3, is taken across collector resistor 80 and is coupled by means of lead 89 to the base of transistor 93.

Transistor 93 is a video summing amplifier stage and forms part of the video threshold and switching circuitry. The output from transistor 93 is electrically coupled to the emitter of transistor 95 via a network consisting of a resistor 90 and diode 94. The base of transistor 95 is electrically coupled to an adjustable resistance 96 which permits adjustment of the video threshold level. Also electrically coupled to the base of transistor 95 is one side of potentiometer 97; the adjustable arm is connected to the base of transistor 98. This adjustment provides video switch balancing. Transistor 99 is directly coupled to the emitter of transistor 98 by means of its base. The emitter of transistor 99 is directly coupled to the emitter of transistor 67. The base of transistor 67 is coupled to junction 124 via a series resistor (not numbered). The output of transistor 67 is coupled to the base of transistor video amplified 70 and an output is taken across the collector resistor 71 of transistor 70, and is coupled to terminal 73 by means of coupling capacitor 72.

Figure 4D:
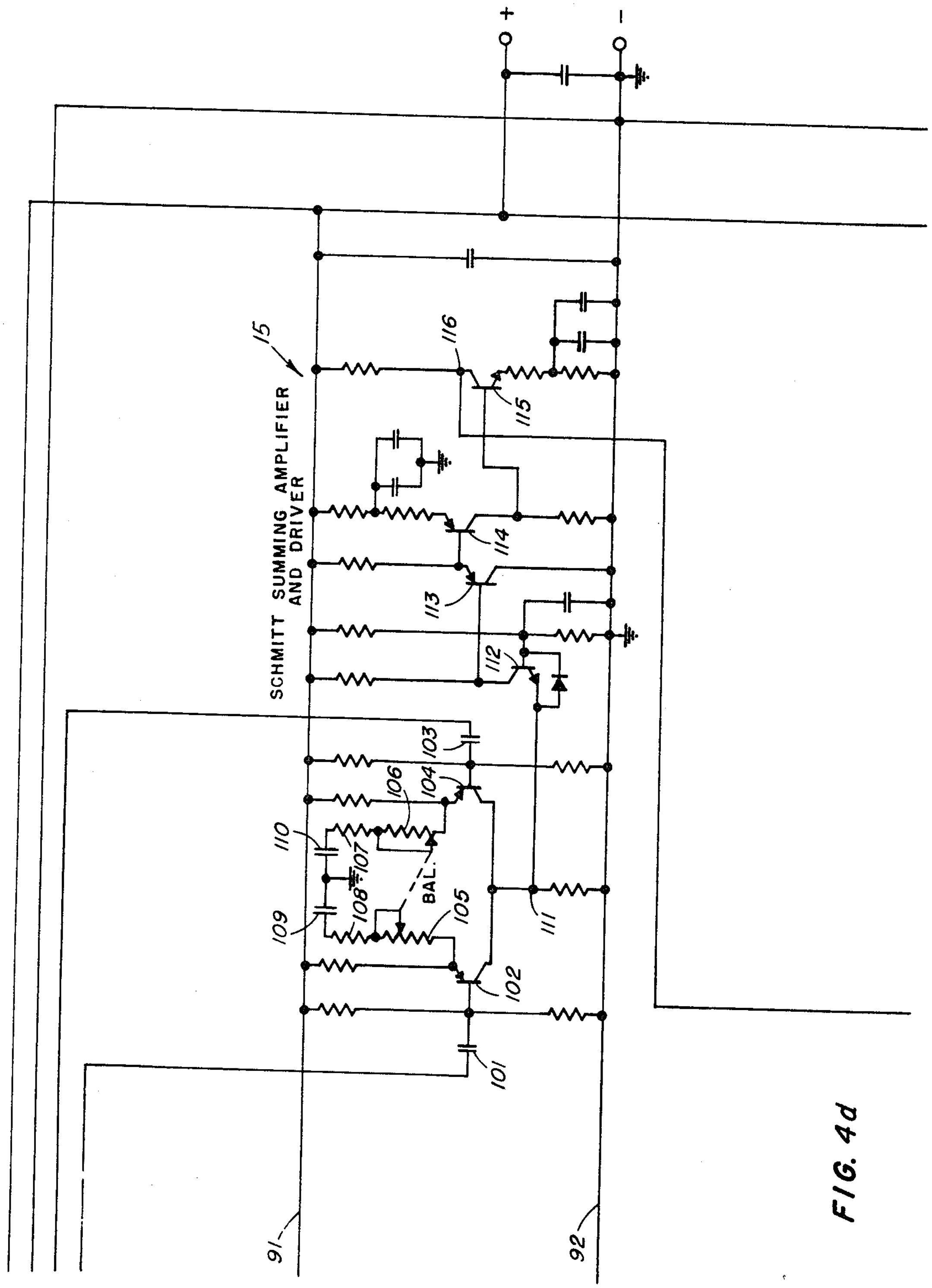
Figure 4E:
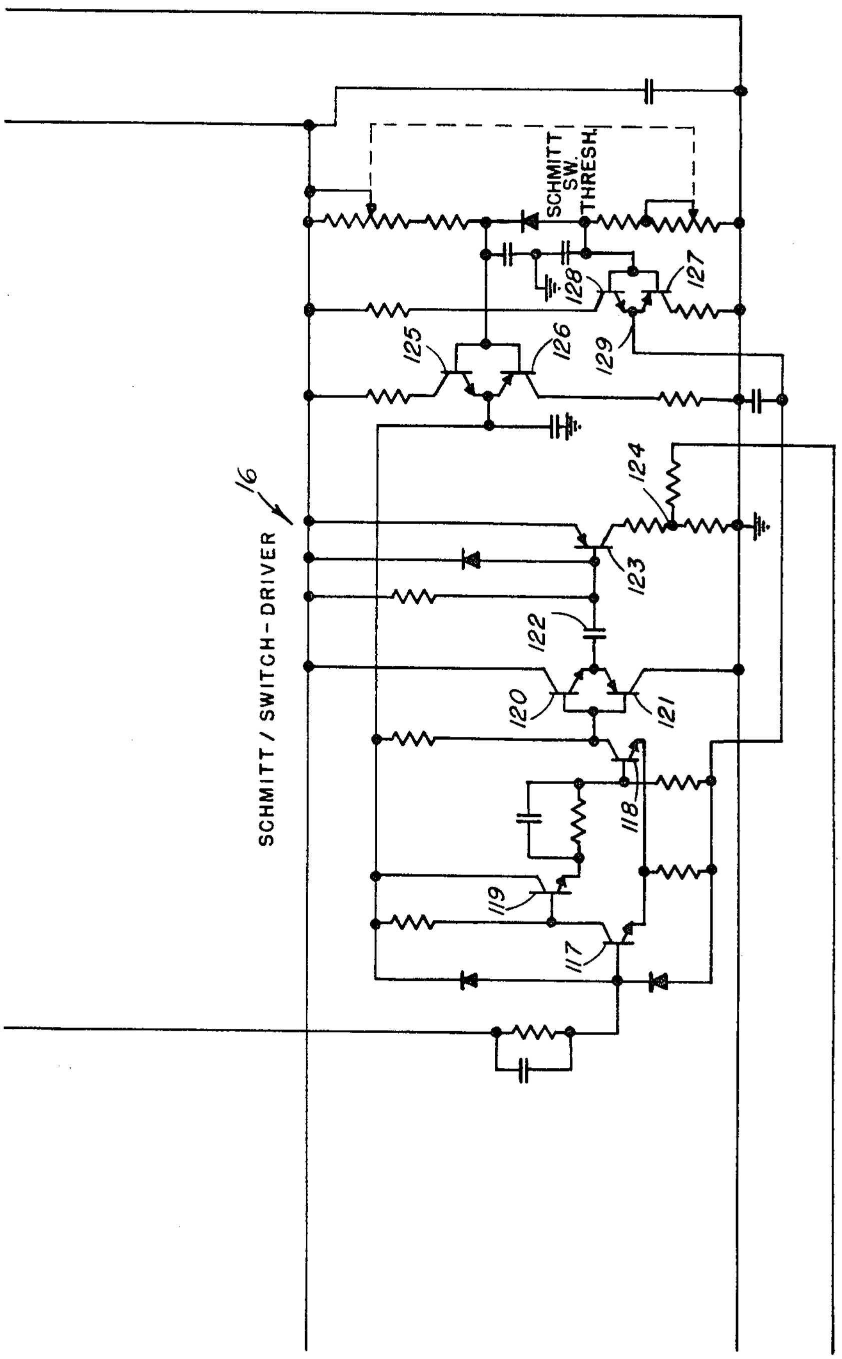

Referring now to FIG. 4*d* and more specifically with reference to the illustration of the summing amplifier circuitry, where there is shown the two waveforms A and C coupled to the base of transistors 102 and 104, respectively, this circuitry is similar to the video summing amplifier circuitry described above. The two emitters of transistors 102 and 104 are coupled to ground potential via a variable resistance capacitance network; the emitter of transistor 104 being coupled to ground via variable resistance 106, fixed resistor 107, and fixed capacitance 110, and the emitter of transistor 102 being coupled to ground via variable resistance 105, fixed resistance 108, and fixed capacitance 109. The collectors of transistor 102 and 104 are connected together at junction 111 and an output is taken from this junction and fed to the emitter of transistor 112. Transistor 112 has its base coupled in common base transistor amplifier configuration and has its output directly coupled from the collector to the base of transistor 113. An additional amplifier stage, transistor 114, is directly coupled to receive the output from transistor 113. This stage is coupled to the emitter of transistor 113 by its base. An output is taken from the collector of transistor 114 and is coupled to the base of transistor 115. This stage is directly coupled to the collector of transistor 114. An output is taken from the collector of transistor 115 at junction 116 and is coupled to the base of transistor 117 which is in the Schmitt trigger circuitry.

The Schmitt trigger circuitry is made up of the three transistors 117, 118 and 119 coupled in conventional Schmitt trigger circuitry configuration. An output from the Schmitt trigger is coupled to an RC differentiator network via NPN transistor 120 and PNP transistor 121. This RC differentiator network comprising capacitor 122 and resistor 130 is coupled between the base of transistor 123 and the series coupled emitters of transistors 120 and 121, respectively. A diode 131 is coupled from the base of transistor 123 to the positive potential line 91.

The Schmitt trigger is controlled by means of a threshold network. This network comprises transistors 125 and 126 (PNP and NPN transistors, respectively) coupled to a resistance-capacitance network on the positive side of the DC potential line 91. The negative side of the Schmitt trigger potential 92 is controlled by a similar network consisting of transistors 127 and 128 coupled in like arrangement.

The following general description of the operation of the target background discriminator is explained with reference to FIG 3 and FIGS. 4*a* through 4*e*. An electrically video signal input, such as that representative of waveform A, in FIG. 3, is electrically connected to terminal 21 and is amplified through two transistorized video amplifier stages, transistors 22 and 24, respectively. A third video amplifier stage, transistor 26, is provided with a gain control 25 in the input circuit to allow adjustment of input current. These three transistorized input video amplifier stages provide the necessary gain and power to drive the variable delay lines 33 and 38, respectively. The prime function of the video gain stage, transistor 26, is to permit input signals above and below a predetermined amplitude to drive the system so as to obtain maximum linear response. An electrical output coupled from the emitter of transistor 26 feeds two direct coupled transistorized amplifier stages; transistors 28 and 29. The amplified signal from transistor 28 and transistor 29, respectively, is fed to a first variable delay network 33. The delayed pulse from network 33 is capacitively coupled by means of capacitor 24 to two additional directly coupled transistorized stages 36 and 37, respectively. An electrical output waveform such as that representative by B waveform in FIG. 3 is electrically coupled to the base of transistor 79 in the video summing amplifier circuitry. This output is taken from the emitter circuitry of the transistor 36 at junction 40 and the output is directly coupled to video stage 41; this stage also having a means for providing AC balance for the difference amplifier circuitry. This function is accomplished by adjustment of variable resistance 39 in the base circuitry of transistor 41. The delayed and amplified pulse waveform representative of C is directly coupled to the base of transistor video amplifier 27. An output is taken from the emitter of transistor 27 and is coupled via a capacitor 103 to the transistor 104 which is in video summing amplifier network.

Referring now to FIGS. 3 and 4*b*, once the input signal has been amplified by the respective video stages, it is coupled to the summing amplifier circuitry via a coupling capacitor 77. This signal is representative of the A waveform and is coupled to junction 32 directly before the variable delay network 33. Another output is taken from junction 40 which is representative of the B waveform and this waveform is coupled to the other input of the video summing amplifier via coupling capacitor 76. The two input transistor stages 78 and 79, respectively, are operated as common emitter amplifiers and their respective collector currents are summed through a common load. The collector load consists of the parallel combination of a resistor, not numbered, and a common base amplifier stage transistor 87. The common base amplifier stage 87 improves the frequency response and dynamic range of the summing amplifier. A single ended output is obtained from across the collector resistor 80 of transistor 87 and is coupled via the electrical lead 89 to the transistor stage 93 in the video threshold and switching circuitry.

The two summing transistorized amplifiers 78 and 79 are provided with an AC balance control consisting of adjustable resistors 81 and 84, and resistors 82, 83 and capacitors 85 and 86. This balance control connected to the respective emitters of transistors 78 and 79, respectively, permits attainment of proper common mode rejection in the difference operation.

The waveform $B-A$ that is electrically fed to the base of transistor 93, best shown by reference to FIG. *4c*, is amplified and the output is fed through diode 94. Diode 94 operates in a low impedance circuit to provide sharp threshold action and wide bandwidth when operating as the video threshold. This video threshold level is adjustable by adjusting transistor input 95 with potentiometer 96. The output from the threshold is a replica of that portion of the difference signal which exceeds the threshold value set $T_V$ and this signal is coupled via resistor 69 to the collector of transistor 67. The video switching circuitry transistors 67, 99 and 98 are used to gate the output of the threshold circuit and they are driven by the switching signal coupled to the base of transistor 67 from the Schmitt trigger circuitry. The video switch turns the video signal off by shunting the signal from the video threshold circuitry transistor 95, thus, allowing the video switching circuitry to be opened only when the magnitude of the difference signal, $A-C$, exceeds the switching threshold level $T_V$. At all other times, including the condition of zero input signal, the switching circuitry has the ability to reject wide positive pulses whose width is greater than W and all negative pulses. The video signal taken from the switch circuitry is taken across collector resistor 69 of transistor 67, is amplified and inverted by transistor 70, and is capacitively coupled to the video output cable termination 73.

With reference now to FIG. 4*d* and more particularly referring to the video summing amplifier network, there is shown a circuitry having two input waveforms A and C coupled from the input video amplifier stages. This summing amplifier stage has the same circuitry configuration as the video summing amplifier circuitry whose operation was explained above. Essentially it accepts the A and C waveforms as shown in FIG. 3 and sums these two waveforms and gives an output which is a single-ended output and which appears across junction 111. This output is fed to transistor 112 which is a common base transistor amplifier stage. An output from the collector of transistor 112 is directly coupled to three direct coupled transistorized amplifier stages, transistors 113, 114 and 115. These stages provide a highly amplified replica of the difference signal which is obtained from the output of the summing amplifier circuitry. Transistor 115 also provides an inverting characteristic to the waveform and the output taken from its collector at junction 116 is coupled to the Schmitt tirgger circuitry, best shown with reference to FIG. 4*e*.

The operation of the Schmitt trigger circuitry is designed so that it operates on the highly amplified replica of the difference signal and provides an output when the difference signal passes through zero. The exact triggering point is determined by the setting of a variable threshold circuitry network. This threshold adjustment is obtained by adjusting variable resistors 132 and 133 which with their respective transistors (125, 126 and 128, 129) permits a shift in the level of the power supply potential for the Schmitt trigger circuit. The output of the Schmitt trigger is differentiated by capacitor 122 and resistor 130 and the negative portion is clipped by diode 131. The remaining waveform is amplified by transistor 123 and is coupled to the base of transistor 67 via junction 124.

In summary, it is now readily apparent that the discriminator system of the instant disclosure is basically a pulse width discriminator which has the capability of selecting positive pulses which are greater than a selectable minimum amplitude and narrower than a selectable pulse width even if these pulses are superimposed on high level background signals. The video threshold circuitry passes difference signals which are above the positive threshold setting, and provides a switching signal which will turn the video switch on when the amplitude of waveforms A and C are approximately equal. This condition corresponds to the possibility of a narrow positive or negative pulse stored in the delay line memory. A video output will be obtained only when both sets of the above conditions are satisfied simultaneously.

Obviously many modifications and variations of the present invention are possible in the light of the above teachings. It is therefore to be understood that within the scope of the appended claims the invention may be practiced otherwise than as specifically described.

What is claimed is:

1. An electrical discriminator circuitry apparatus for processing the electrical output of an infrared raster scanning sensor to distinguish the location of a point target video return in an extended cloud formation comprising:

first delay means coupled to said video signal input means for providing a predetermined delay to the video signal;

second delay means coupled to electrically receive the output of said first delay means for further providing additional predetermined delay to the video signal;

first adder means having two input circuits, said inputs electrically coupled so as to place said adder in parallel circuitry arrangement with said first delay means for providing an output voltage representative of the difference voltage between the two said inputs;

video threshold means coupled to receive the difference voltage for providing an output only when the difference signal is above a predetermined value;

video summing amplifier means having two input circuits and a single ended output, said input circuits electrically coupled to place said video summing amplifier means in parallel circuitry arrangement with said first and second delay means;

bistable multivibrator means electrically coupled to receive the single output of said video amplifier means; and video switch means electrically coupled to receive the output voltage from said video threshold means and said bistable multivibrator means for providing a positive video output.

2. An electronic circuitry apparatus for processing the electrical output of an infrared raster scanning sensor to distinguish the location of a point target video return in an extended cloud formation comprising:

first video amplifier means for providing amplification and level adjustment of the video input signal;

first delay means electrically coupled to receive the output from said video amplifier means for inserting a predetermined delay to the video signal;

second delay means electrically coupled to receive the output from said first delay means for inserting a further predetermined delay in the video signal;

video summing amplifier means having first and second inputs;

said first input electrically coupled to the input of said first delay means said second input electrically coupled to the input of said second delay means;

video threshold means electrically coupled to receive the output from said video summing amplifier means;

summing amplifier means having first and second inputs;

said first input electrically coupled to receive the output from said first video amplifier means and said second input coupled to receive the output of said second delay means;

Schmitt switch threshold means electrically coupled to receive the output from said summing amplifier means;

Schmitt trigger circuitry means electrically coupled to said Schmitt switch threshold means for providing variable adjustment to the Schmitt trigger circuitry means;

and video switch means electrically coupled to receive outputs from said video summing amplifier and said Schmitt trigger means for providing a positive video output signal.

3. An electronic discriminator circuitry apparatus for processing the electrical output of an infrared raster scanning sensor to distinguish the location of a point target video return in an extended cloud formation comprising:

first delay means coupled to said video signal input means for providing a predetermined delay to the video signal;

second delay means coupled to electrically receive the output of said first delay means for further providing additional predetermined delay to the video signal;

first adder means having two input circuits, said inputs electrically coupled so as to place said adder in parallel circuitry arrangement with said first delay means;

second adder means having two input circuits, said input circuits electrically coupled to place said second adder means in parallel circuitry arrangement with said first and second delay means, wherein said second adder means comprises a video summing amplifier circuitry having a single ended output;

video threshold means electrically coupled to receive the output of said first adder for providing an output voltage when the difference signal is greater than a predetermined threshold value;

switching signal generator means electrically coupled to receive the output from said second adder for providing an output voltage when the difference signal is less than a predetermined value, wherein said switching generator comprises a bistable pulse generator; and video switch means electrically coupled to receive the output voltage from said video threshold means and said switching signal generator means for turning the video switch to deliver a positive pulse output only when a difference signal is above the threshold value and the amplitude of the two voltage inputs to said second adder are approximately equal.

4. The circuitry apparatus of claim 3 wherein the bistable pulse generator comprises:

a Schmitt trigger circuitry.

References Cited

Millman, J. and Taub, H.: Pulse and Digital Circuits, 1956, pp. 164–173.

RALPH G. NILSON, *Primary Examiner.*

S. ELBAUM, *Assistant Examiner.*